United States Patent [19]

Singer et al.

[11] Patent Number: 4,500,680
[45] Date of Patent: Feb. 19, 1985

[54] AROMATIC ACID CATALYSTS PROVIDING IMPROVED HUMIDITY RESISTANCE

[75] Inventors: Debra L. Singer, Pittsburgh; Gregory J. McCollum, Glenshaw; Rostyslaw Dowbenko; James B. O'Dwyer, both of Gibsonia, all of Pa.

[73] Assignee: PPG Industries, Inc., Pittsburgh, Pa.

[21] Appl. No.: 551,389

[22] Filed: Nov. 14, 1983

[51] Int. Cl.$^3$ .................. C08L 61/20; C08L 67/00; C08L 75/00
[52] U.S. Cl. .................. 525/143; 525/163; 525/405; 525/406; 525/442; 525/443; 525/456; 525/480; 525/509
[58] Field of Search ............... 525/162, 163, 443, 505, 525/519, 353, 143, 405, 406, 442, 456, 480, 509

[56] References Cited

U.S. PATENT DOCUMENTS

| | | | |
|---|---|---|---|
| 2,141,893 | 12/1938 | Zitscher et al. | 260/505 R |
| 2,227,708 | 1/1941 | Cordier | 524/35 |
| 2,631,138 | 3/1953 | Dannenberg | 525/510 |
| 2,961,424 | 11/1960 | Mueller et al. | 525/162 |
| 3,293,324 | 12/1966 | Tropp et al. | 525/437 |
| 3,384,606 | 5/1968 | Dieterich et al. | 524/840 |
| 3,474,054 | 10/1969 | White | 427/385.5 |
| 3,732,273 | 5/1973 | Heine et al. | 260/456 R |
| 3,798,262 | 3/1974 | Ziegler et al. | 260/505 R |
| 3,840,591 | 10/1974 | Lee et al. | 260/505 R |
| 3,842,021 | 10/1974 | Grant et al. | 428/402 |
| 3,907,706 | 9/1975 | Robins | 252/431 C |
| 3,919,351 | 11/1975 | Chang et al. | 525/127 |
| 3,979,478 | 9/1976 | Gallacher | 525/443 |
| 4,045,411 | 8/1977 | Vasishth et al. | 525/505 |
| 4,075,176 | 2/1978 | Gallacher | 528/254 |
| 4,083,830 | 4/1978 | Gallacher | 528/254 |
| 4,154,891 | 5/1979 | Porter, Jr. et al. | 524/539 |
| 4,192,826 | 3/1980 | Beresniewicz et al. | 525/425 |
| 4,200,729 | 4/1980 | Calbo | 525/398 |
| 4,247,461 | 1/1981 | Lin et al. | 260/239.1 |
| 4,281,075 | 7/1981 | Chattha | 525/110 |
| 4,350,790 | 9/1982 | Chattha | 525/110 |
| 4,454,274 | 6/1984 | Singer et al. | 524/157 |

FOREIGN PATENT DOCUMENTS

| | | | |
|---|---|---|---|
| 33038 | 8/1981 | European Pat. Off. | |
| 2229364 | 1/1974 | Fed. Rep. of Germany | |
| 2812397 | 3/1979 | Fed. Rep. of Germany | 525/163 |
| 56-3357 | 4/1982 | Japan | |
| 56-3358 | 4/1982 | Japan | |
| 1107321 | 3/1968 | United Kingdom | 525/163 |
| 1361929 | 7/1974 | United Kingdom | |
| 1413054 | 11/1975 | United Kingdom | |
| 1560821 | 2/1980 | United Kingdom | |

OTHER PUBLICATIONS

Matar and Mekkawy, "The Effect of Ring Size and 2-Methyl Substituents on the Rate of Elimination of Cycloalkyl Tosylates in Dimethyl Sulphoxide", Indian J. Chem., vol. 13, May 1975, pp. 530–531, published by Counsel of Scientific and Ind. Research, Publ. & Inf. Directorate, Hillside Rd., New Delhi, India 110012.

Kotani, "Pyrolysis and Acetolysis of Some Sulfonic Esters, Bulletin of the Chemical Society of Japan, vol. 39, Aug. 1966, pp. 1767–1773, Publ. by Chemical Society of Japan-Nippon, 5 1-Chome, Kanda-Surugadai, Chiyoda-Ku, Tokyo, Japan 101.

Matar and Mekkawy, "Effect of Ring Size and 2--Methyl Substituents on the Rate of Elimination of Cycloalkyl Tosylates in Dimethyl Sulfoxide", J. Indian Chem. Soc., vol. LI, Sep. 1974, pp. 839–840, Publ. by Counsel of Scientific & Ind. Research, Publ. & Inf. Directorate, Hillside Rd., New Delhi, India 110012.

*Primary Examiner*—John Kight
*Assistant Examiner*—Kriellion Morgan
*Attorney, Agent, or Firm*—Linda Pingitore

[57] ABSTRACT

Curable compositions with improved humidity resistance are composed of an active hydrogen-containing resin which is essentially free of glycidyl groups, a curing agent present externally and/or internally as a part of the active hydrogen-containing resin, and a catalytic amount of a sulfonic acid having a molecular weight of less than 500 and represented by the following structural formula:

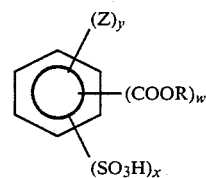

wherein:
Z is a radical independently selected from $C_1$ to $C_{20}$ alkyl, $C_3$ to $C_{20}$ cycloalkyl, $C_6$ to $C_{18}$ aryl, halogen, alkoxy, and aryloxy;
R is independently selected from hydrogen, $C_1$ to $C_{20}$ alkyl, $C_3$ to $C_{20}$ cycloalkyl and $C_6$ to $C_{18}$ aryl;
y is an integer from 0 to 4; w is an integer from 0 to 2;
x is an integer from 1 to 3, with the proviso that when w is 0, y is an integer from 1 to 4 and x is an integer from 2 to 3 and when y is 0, w is an integer from 1 to 2 and x is an integer from 1 to 2.

12 Claims, No Drawings

AROMATIC ACID CATALYSTS PROVIDING IMPROVED HUMIDITY RESISTANCE

BACKGROUND OF THE INVENTION

The present invention relates to the use of sulfonic acids as catalysts in resinous compositions.

Resinous compositions which are cured with aminoplast curing agents generally use an acid catalyst. A substantial number of acid catalysts are known and have been conventionally utilized such as boric acid, phosphoric acid, and a variety of sulfonic acids, for example, paratoluenesulfonic acid and methanesulfonic acid and disulfonic acids such as dinonylnaphthalene disulfonic acid and benzene disulfonic acid. U.S. Pat. Nos. 2,631,138, 2,961,424, 3,474,054, 3,979,478, and 4,083,830 describe such catalysts.

Although effective for the majority of uses, many of the known sulfonic and disulfonic acid catalysts have limitations, in particular applications. For instance, these materials often contribute to impaired humidity resistance in some coating compositions. There is therefore a need for a strong acid catalyst which will not only provide a rapid, effective cure at a moderate temperature, but also provide improved humidity resistance.

SUMMARY OF THE INVENTION

In accordance with the present invention there is provided an improved curable composition comprising an active hydrogen-containing resin which is essentially free of glycidyl groups, a curing agent present externally and/or internally as a part of the active hydrogen-containing resin, and as acid catalyst a catalytic amount of a sulfonic acid having a molecular weight of less than 500 and represented by the following structural formula:

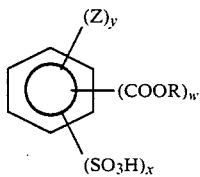

wherein:

Z is a radical independently selected from $C_1$ to $C_{20}$ alkyl, $C_3$ to $C_{20}$ cycloalkyl, $C_6$ to $C_{18}$ aryl, alkoxy, hydroxyl, and aryloxy;

R is independently selected from hydrogen, $C_1$ to $C_{20}$ alkyl, $C_3$ to $C_{20}$ cycloalkyl, and $C_6$ to $C_{18}$ aryl;

y is an integer from 0 to 4;

w is an integer from 0 to 2; and x is an integer from 1 to 3, with the proviso that when w is 0, y is an integer from 1 to 4 and x is an integer from 2 to 3 and when y is 0, w is an integer from 1 to 2 and x is an integer from 1 to 2.

DETAILED DESCRIPTION OF THE INVENTION

The aromatic sulfonic acid catalysts of the present invention have a molecular weight of less than 500 and can be represented by the following structural formula:

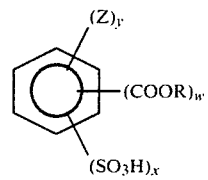

In the above formula (I) Z is a radical independently selected from $C_1$ to $C_{20}$ alkyl radicals, $C_3$ to $C_{20}$ cycloalkyl radicals, $C_6$ to $C_{18}$ aryl radicals, halogen radicals, alkoxy radicals, hydroxyl, and aryloxy radicals. In the above formula, y is an integer from 0 to 4, preferably 1 to 2, w is an integer from 0 to 2, preferably 1, and x is an integer from 1 to 3, preferably 1 to 2, with the proviso that when w is 0, y is an integer from 1 to 4 and x is an integer from 2 to 3 and when y is 0, w is an integer from 1 to 2 and x is an integer from 1 to 2. R in the above formula includes hydrogen, $C_6$ to $C_{18}$ aryl, $C_1$ to $C_{20}$ alkyl and $C_3$ to $C_{20}$ cycloalkyl radicals. It should be understood that the aforesaid alkyl, cycloalkyl, aryl, alkoxy, and aryloxy radicals can be substituted with a variety of substituents so long as they do not detract from the properties of the sulfonic acid catalysts.

Substituents representative of Z include methyl, ethyl, propyl, isopropyl, butyl, isobutyl, hexyl, cyclopentyl, cyclohexyl, cycloheptyl, phenyl, chloro, bromo, fluoro, methoxy, ethoxy, butoxy, hexyloxy, and phenoxy. Preferably Z is a $C_1$ to $C_{10}$ alkyl, for example, methyl and y is an integer from 1 to 2.

Substituents representative of R in formula (I), above, include methyl, ethyl, propyl, isopropyl, and 2-ethylhexyl; preferably R is isopropyl or 2-ethylhexyl.

Preferred compounds for use as catalysts in accordance with the claimed invention include toluene 2,4-disulfonic acid, 1,3-xylene-4,6-disulfonic acid, 2-ethylhexyl o-sulfobenzoate, 2-propyl o-sulfobenzoate, 2-propyl, 3,5-disulfobenzoate, and 2-ethylhexyl 3,5-disulfobenzoate. Although these isomers are most prevalent, other position isomers are also formed. It should be understood that amine and partial amine salts of the sulfonic acid catalysts of the present invention are also useful.

The disulfonic acids of the present invention represented by formula (I) above can be prepared by art recognized methods, for example by alcoholysis of the corresponding chlorosulfonation products of the parent aromatic compound. The parent aromatic compound is added to an excess of chlorosulfonic acid at ambient temperature. The mixture is then heated at a temperature and for a period depending upon the reactivity of the aromatic compound, cooled and diluted with sulfuric acid. An organic solvent such as methylene chloride is added to facilitate the separation of the disulfonyl chloride and the organic layer is washed, dried and the solvent evaporated to yield the disulfonyl chloride. Conversion of the disulfonyl chlorides to the free acids is accomplished by heating the disulfonyl chloride with excess alcohol such as methanol, ethanol, or isopropyl alcohol. Further details are not felt to be necessary for an understanding of the present invention however if details are desired reference is made to Suter, *Organic Reactions*, Volume III, page 141, John Wiley and Son Publishers, New York, copyright 1944.

The mono- and disulfobenzoates represented by formula (I) above can be prepared by reacting the chloride of the desired sulfobenzoate with an alcohol, for example, isopropanol or 2-ethylhexanol. The necessary chloride of the desired acid can be prepared, for example, from the disodium salt of the sulfobenzoic acid and, for example, phosphorus pentachloride. Alternatively the mono- and disulfobenzoates can be prepared via a transesterification reaction between a sulfobenzoate prepared by the route described above and a desired alcohol.

The sulfonic acid catalysts of the present invention are useful as catalysts in curable compositions which are capable of acid catalyzed crosslinking and comprise in addition to the catalyst an active hydrogen-containing resin which is essentially free of glycidyl groups and a crosslinking agent present externally and/or internally as a part of the active hydrogen-containing resin. Although a variety of polymeric polyols can be used herein as the active hydrogen-containing resin, the sulfonic acids of the present invention are particularly useful in compositions prepared with polymeric polyols which are sensitive to humidity since the catalyst contributes toward good humidity resistance of the final cured coating.

Exemplary of useful polymeric polyols are polyether polyols, polyester polyols, acrylic polyols and polyurethane polyols which are disclosed in U.S. Pat. No. 4,154,891, column 3, lines 26 to 68, column 4, lines 1 to 68, column 5, lines 1 to 68, and column 6, lines 1 to 2, said disclosure being hereby incorporated by reference. The polymeric polyols useful in preparing the composition of the present invention have a hydroxyl number ranging from about 48 to about 435, and an acid value ranging from 0 to about 160.

The aforedescribed polyols require a crosslinking or curing agent to cure to a durable film. The crosslinking agent is responsive to acid catalysts and can be present externally or internally as part of the active hydrogen-containing resin. Examples of external curing agents are aminoplast resins and phenoplast resins, with the aminoplast resins being preferred. The aforesaid external crosslinking agents are described in detail in U.S. Pat. No. 3,919,351, column 5, lines 34 to 68 and column 6, lines 1 to 25, which disclosure is incorporated by reference herein.

The curing agent can also be part of the active hydrogen-containing resin. Examples of resins of this type are interpolymers of an N-alkoxymethyl substituted unsaturated carboxylic acid amide with at least one other monomer having a $CH_2=C<$ group, said interpolymers being characterized by having amido hydrogen atoms replaced by the structure $-RCHOR_1$, wherein R is selected from the group consisting of hydrogen and saturated lower aliphatic hydrocarbon radicals and $R_1$ is a member of the class consisting of hydrogen and lower alkyl radicals with the proviso that the interpolymer having a hydroxyl number of at least 10. In general, these interpolymers can be produced in two ways. In the first method, the unsaturated carboxylic acid amide chosen is an N-alkoxymethyl acrylamide (i.e., a material having an $-NHRCHOR_1$ group in the molecule). This N-alkoxymethyl acrylamide is then polymerized with at least one other monomer having a $CH_2=C<$ group to produce a useful interpolymer. In the second method, an unsaturated carboxylic acid amide, e.g., acrylamide is polymerized with at least one other monomer having a $CH_2=C<$ group and is then reacted with an aldehyde to form a useful interpolymer.

Examples of useful interpolymers and their method of manufacture are disclosed in U.S. Pat. Nos. 2,978,437; 3,037,963 and 3,079,434.

Additionally useful herein are a class of interpolymers of N-alkoxymethyl substituted unsaturated carboxylic acid amides, especially N-alkoxymethyl acrylamides as described above, with polyethylenically unsaturated polyesters. The amido nitrogens of such an interpolymer are replaced by the structure $-RCHOR_1$, wherein R can be hydrogen or saturated lower aliphatic hydrocarbon radicals and $R_1$ can be hydrogen or a $C_1-C_{10}$ aliphatic hydrocarbon radical. Any number of unsaturated polyesters may be utilized so long as they are polyethylenically unsaturated.

Both of the aforesaid classes of interpolymers are capable of crosslinking without the necessity of adding external crosslinking resin. It is noted that although an external crosslinking resin is not necessary for those aforedescribed interpolymers capable of internal crosslinking, satisfactory results are attainable if an external curing agent is also added. For this purpose, the aminoplast and phenoplast crosslinking resins described above can be utilized.

When added externally, the crosslinking resin is usually present in an amount of from about 10 percent to about 90 percent by weight based on the total weight of the resinous components of composition. When the curing agent is present internally it is usually present in an amount of from about 5 to 95 percent by weight of the interpolymer, the percentages being based upon the total weight of the resinous composition.

The acid catalysts of the claimed invention are utilized in a catalytic amount; that is, an amount sufficient to accelerate the cure of a coating composition to a commercially acceptable rate. Typically, the catalyst is added to the composition immediately prior to use in an amount ranging from about 0.1 percent to about 20 percent by weight, preferably 0.1 to 5 percent by weight, the percentages being based on the total weight of the resinous components of composition.

In addition to the aforedescribed components, the curable compositions of the present invention ordinarily contain other optional ingredients such as pigments, fillers, plasticizers, flow control agents and other formulating additives. The compositions are typically contained in a solvent which can be any solvent or solvent mixture in which the materials employed are compatible and soluble to the desired extent. For example, suitable solvents include methyl amyl ketone, xylene, toluene, methyl ethyl ketone, methyl isobutyl ketone, ethylene glycol monoethyl ether, and ethylene glycol monobutyl ether.

The curable compositions herein can be applied in any conventional manner, including brushing, flow coating, spraying, and the like. They are preferably intended for application on metallic substrates such as steel or aluminum, primed or unprimed, alhough they can readily be applied over any substrate.

The curable compositions of the present invention can be cured thermally. The temperature utilized for cure of the claimed compositions varies widely depending upon the particular catalyst and resin system chosen. Typically temperatures between about 60° C. and about 200° C. are utilized, preferably between about 100° C. and 150° C. The length of time for cure can also vary widely, however, from about 2 to 90 minutes is typical.

In addition to use in coating compositions, the acid catalysts of the present invention are also useful in other curable compositions such as molding and laminating compositions.

The following examples are submitted for the purpose of further illustrating the nature of the present invention and should not be construed as a limitation on the scope thereof.

EXAMPLE I

Preparation of 2-propyl 3,5-disulfobenzoate

Into a one-liter, four-necked, round bottom flask equipped with thermometer, distillation head, and glass stirrer with TEFLON paddle were charged 101.6 grams of 3,5-bis(chlorosulfonyl)benzoyl chloride* and 600 grams of isopropyl alcohol. The solution was distilled to a pot temperature of 105° C., cooled to 80° C., charged with a second 600 gram aliquot of isopropyl alcohol and distilled once again to a pot temperature of 105° C. The resultant 2-propyl 3,5-disulfobenzoate was a light brown, hazy liquid having an acid value of 202.4 and being free of residual chloride (determined using the silver nitrate test).

*The 3,5-bis(chlorosulfonyl)benzoyl chloride was prepared in the following manner:

Into a three-liter, round bottom flask equipped with a glass stirrer with TEFLON paddle, thermometer, condenser, and air aspirator were charged 152.4 grams of moist disodium 3,5-disulfonatobenzoic acid and 416.4 grams of phosphorus pentachloride. The mixture was warmed slowly to 110° C. and refluxed for 10 hours. A total of 21 grams of liquid was distilled off to a pot temperature of 140° C. The reaction mixture was then cooled to 0° C. and quenched with 200 grams of ice water. Subsequently, 300 grams of methylene chloride were added and the solution was stirred for one hour. The methylene chloride layer was then separated, washed once with cold water (300 grams), dried over magnesium sulfate and filtered. The resultant yellow solution was concentrated in vacuo to yield the 3,5-bis(chlorosulfonyl)benzoyl chloride product as a yellow crystalline product having a melting point within the range of 85° C. to 87° C.

EXAMPLE II

Preparation of 2-Ethylhexyl 3,5-disulfobenzoate

Into a one-liter, four-necked round bottom flask equipped with a thermometer, distillation head, and a glass stirrer with TEFLON paddle were charged 177 grams of 2-propyl 3,5-disulfobenzoate solution in isopropyl alcohol and 200 grams of 2-ethylhexanol. The solution was vacuum distilled to a pot temperature of 105° C. and then held at this temperature for an additional three hours. The resultant 2-ethylhexyl 3,5-disulfobenzoate was a brown viscous oil with an acid value of 165.

EXAMPLE III

Preparation of 2-propyl o-sulfobenzoate

Into a one-liter, four-necked round bottom flask equipped with a thermometer, distillation head, condenser and glass stirrer with TEFLON paddle were charged 117.4 grams of methyl o-(chlorosulfonyl)benzoate and 200 grams of isopropyl alcohol. The mixture was distilled to a pot temperature of 105° C. and the residue tested for the presence of chloride ion using the silver nitrate test. Additional 200 gram aliquots of isopropyl alcohol were added and distillation carried out in the same manner until the reaction mixture was found to be free of chloride ion by the silver nitrate test. The resultant 2-propyl o-sulfobenzoate was a straw colored liquid having an acid value of 182.

EXAMPLE IV

Preparation of 2-Ethylhexyl o-sulfobenzoate

Into a one-liter, four-necked round bottom flask equipped with a thermometer, distillation head, and glass stirrer with TEFLON paddle were charged 82.5 grams of 2-propyl o-sulfobenzoate solution in isopropanol and 100 grams of 2-ethylhexanol. The solution was vacuum distilled to a pot temperature of 105° C. and subsequently the vacuum was turned off and the reaction mixture held at 105° C. for one hour. The resultant 2-ethylhexyl o-sulfobenzoate was a brown liquid with an acid value of 102.

EXAMPLE V

The following example illustrates the effect of prolonged humidity exposure on cured films of coating compositions incorporating sulfonic acid catalysts of the present invention. These results are compared to results of cured films of the same coating compositions incorporating the conventional acid catalyst, para-toluenesulfonic acid. This example demonstrates the excellent humidity resistance of the aromatic disulfonic acid catalysts of the present invention. The following base coating compositions were utilized:

| Ingredients | Parts by Weight (grams) | Percent of Resin Solids |
|---|---|---|
| Composition A: 80 percent resin solids content | | |
| Acrylic Resin[1] | 81.4 | 59 |
| Crosslinking Agent[2] | 40.0 | 41 |
| Aluminum Pigment | 4.6 | |
| Methyl amyl ketone | 20.4 | |
| Cellulose Acetate Butyrate | 12.0 | |
| Composition B: 84 percent resin solids content | | |
| Acrylic Resin[3] | 631.6 | 60 |
| Crosslinking Agent[4] | 320 | 40 |
| Aluminum Pigment | 36.9 | |
| Methyl Amyl Ketone | 344.8 | |

[1]This acrylic resin was prepared from 50 percent hydroxypropyl acrylate, 49 percent butyl methacrylate, and 1 percent methacrylic acid. It had an acid value of 7.3.
[2]Commercially available from American Cyanamid as CYMEL 303.
[3]This acrylic resin has a 76 percent resin solids content on methyl amyl ketone and a hydroxyl number of 67. It is commercially available from Rohm and Haas as ACRYLOID AT-400.
[4]Same as [2] above.

Each catalyst and selected base coating composition were mixed in the amounts shown below in the table and drawn down with a 3-mil draw bar over primed pretreated steel panels (commercially available from Hooker Chemical Company as BONDERITE 40).

All acids were added at equal equivalents. The panels were baked for 20 minutes at 180° F. (82° C.). Each panel was evaluated for gloss (measured with a gloss meter) and then subjected to prolonged humidity exposure (4 hours at 140° F. (60° C.) in a QCT-Condensing Humidity Test Chamber.) After exposure, the panels were again evaluated for gloss. Percent gloss retention was determined as follows:

$$\frac{\text{Final Gloss (after exposure)}}{\text{Initial Gloss}} \times 100\%$$

| Catalyst (Amount in grams) | Base Coating Composition (Amount in grams) | Initial Gloss (20°) | Gloss After Exposure (20°) | Percent Gloss Retention |
|---|---|---|---|---|
| Para-toluene sulfonic acid (2.5 grams) | B (166.6 grams) | 78 | 36 | 46 |
| Para-toluene sulfonic acid (10.0 grams) | A (158.4 grams) | 67 | 20 | 30 |
| Toluene 2,4-disulfonic acid (12 grams) | A (158.4 grams) | 60 | 38 | 63 |
| 1,3-xylene-4,6-disulfonic acid (1.4 grams) | B (166.6 grams) | 81 | 71 | 88 |
| 2-ethylhexyl O—sulfobenzoate (3.3 grams) | B (166.6 grams) | 78 | 27 | 35 |
| 2-ethylhexyl 3,5-disulfobenzoate (3.0 grams) | B (166.6 grams) | 75 | 74 | 99 |
| 2-propyl O—sulfobenzoate (18.0 grams) | A (158.4 grams) | 64 | 10 | 16 |
| 2-propyl 3,5-disulfobenzoate (19.0 grams) | A (158.4 grams) | 55 | 40 | 73 |

What is claimed is:

1. In a curable composition comprising an active hydrogen-containing resin which is essentially free of glycidyl groups, a curing agent present externally and/or internally as a part of the active hydrogen-containing resin, and an acid catalyst, wherein the improvement comprises using as the acid catalyst a catalytic amount of a sulfonic acid having a molecular weight of less than 500 and represented by the following structural formula:

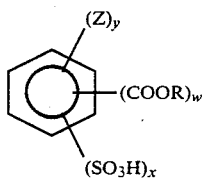

wherein:
Z is a radical independently selected from $C_1$ to $C_{20}$ alkyl, $C_3$ to $C_{20}$ cylcoalkyl, $C_6$ to $C_{18}$ aryl, halogen, alkoxy, hydroxyl, and aryloxy;
R is independently selected from $C_1$ to $C_{20}$ alkyl, $C_3$ to $C_{20}$ cycloalkyl and $C_6$ to $C_{18}$ aryl;
y is an integer from 0 to 4;
w is an integer from 0 to 2;
x is an integer from 1 to 3, with the proviso that when w is 0, y is an integer from 1 to 4 and x is an integer from 2 to 3 and when y is 0, w is an integer from 1 to 2 and x is an integer from 1 to 2.

2. The curable composition of claim 1 wherein Z is $C_1$ to $C_{20}$ alkyl and y is 1.

3. The curable composition of claim 1 wherein Z is $C_1$ to $C_{20}$ alkyl and y is 2.

4. The curable composition of claim 2 wherein the sulfonic acid is toluene 2,4-disulfonic acid.

5. The curable composition of claim 3 wherein the sulfonic acid is 1,3-xylene-4,6-disulfonic acid.

6. The curable composition of claim 1 wherein R is $C_1$ to $C_{20}$ alkyl, x is 1, and w is 1.

7. The curable composition of claim 1 wherein R is $C_1$ to $C_{20}$ alkyl and x is 2, and w is 1.

8. The curable composition of claim 6 wherein the sulfonic acid is 2-ethylhexyl o-sulfobenzoate.

9. The curable composition of claim 6 wherein the sulfonic acid is 2-propyl o-sulfobenzoate.

10. The curable composition of claim 7 wherein the sulfonic acid is 2-propyl 3,5-disulfobenzoate.

11. The curable composition of claim 7 wherein the sulfonic acid is 2-ethylhexyl 3,5-disulfobenzoate.

12. The curable composition of claim 1 wherein the sulfonic acid catalyst is present in an amount ranging from 0.1 to 20 percent by weight based on the resinous components of the composition.

* * * * *

UNITED STATES PATENT AND TRADEMARK OFFICE
CERTIFICATE OF CORRECTION

PATENT NO. : 4,500,680

DATED : February 19, 1985

INVENTOR(S) : Debra L. Singer; Gregory J. McCollum; Rostyslaw Dowbenko; and James B. O'Dwyer.

It is certified that error appears in the above-identified patent and that said Letters Patent are hereby corrected as shown below:

IN THE ABSTRACT, line 13, "alkoxy, and aryloxy;" should read "alkoxy, hydroxyl, and aryloxy;".

Signed and Sealed this

Seventeenth Day of September 1985

[SEAL]

Attest:

DONALD J. QUIGG

Attesting Officer

Commissioner of Patents and Trademarks—Designate